Figure 6:
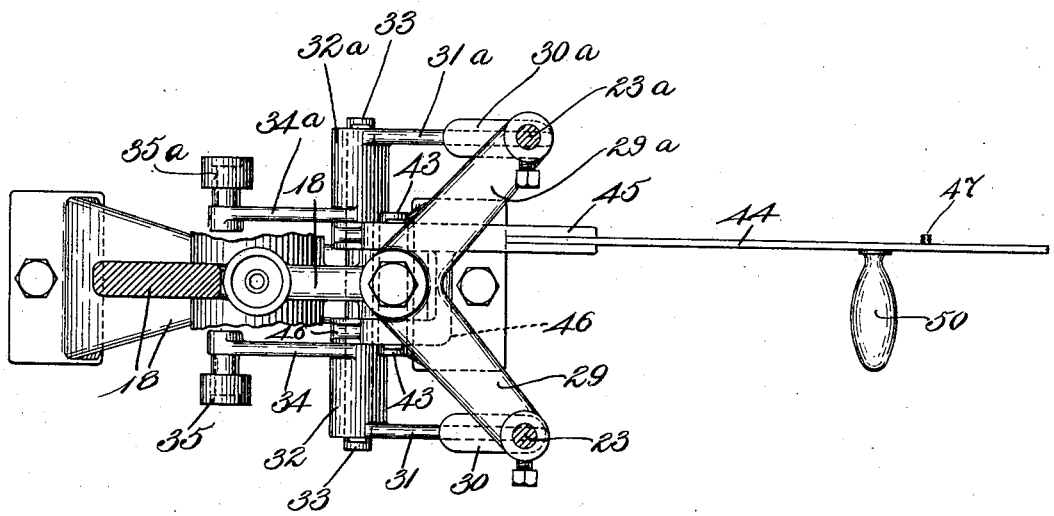

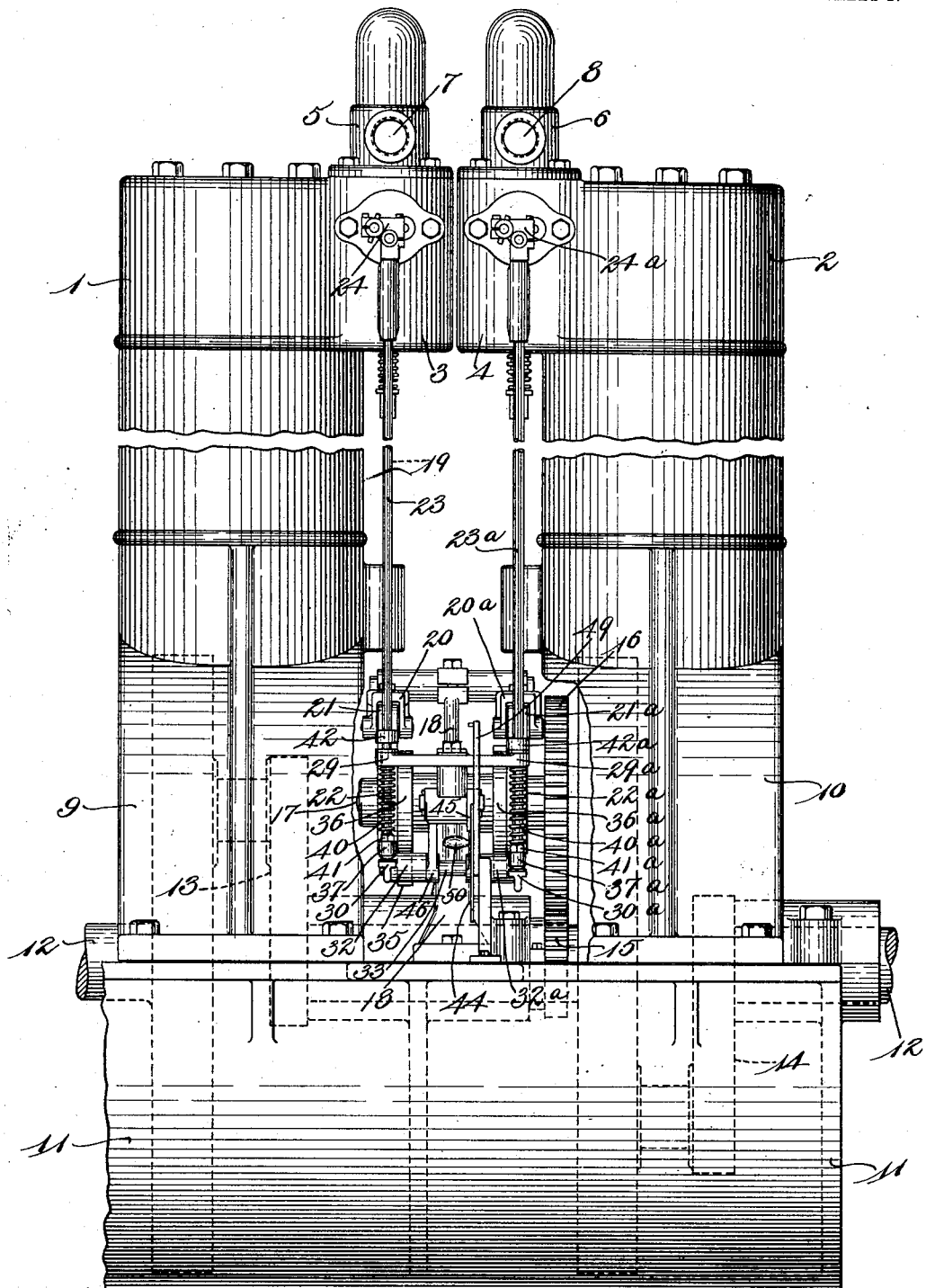

No. 761,271. PATENTED MAY 31, 1904.
G. E. TREGURTHA.
VARIABLE SPARKING MECHANISM.
APPLICATION FILED JUNE 18, 1903.
NO MODEL. 3 SHEETS—SHEET 2.
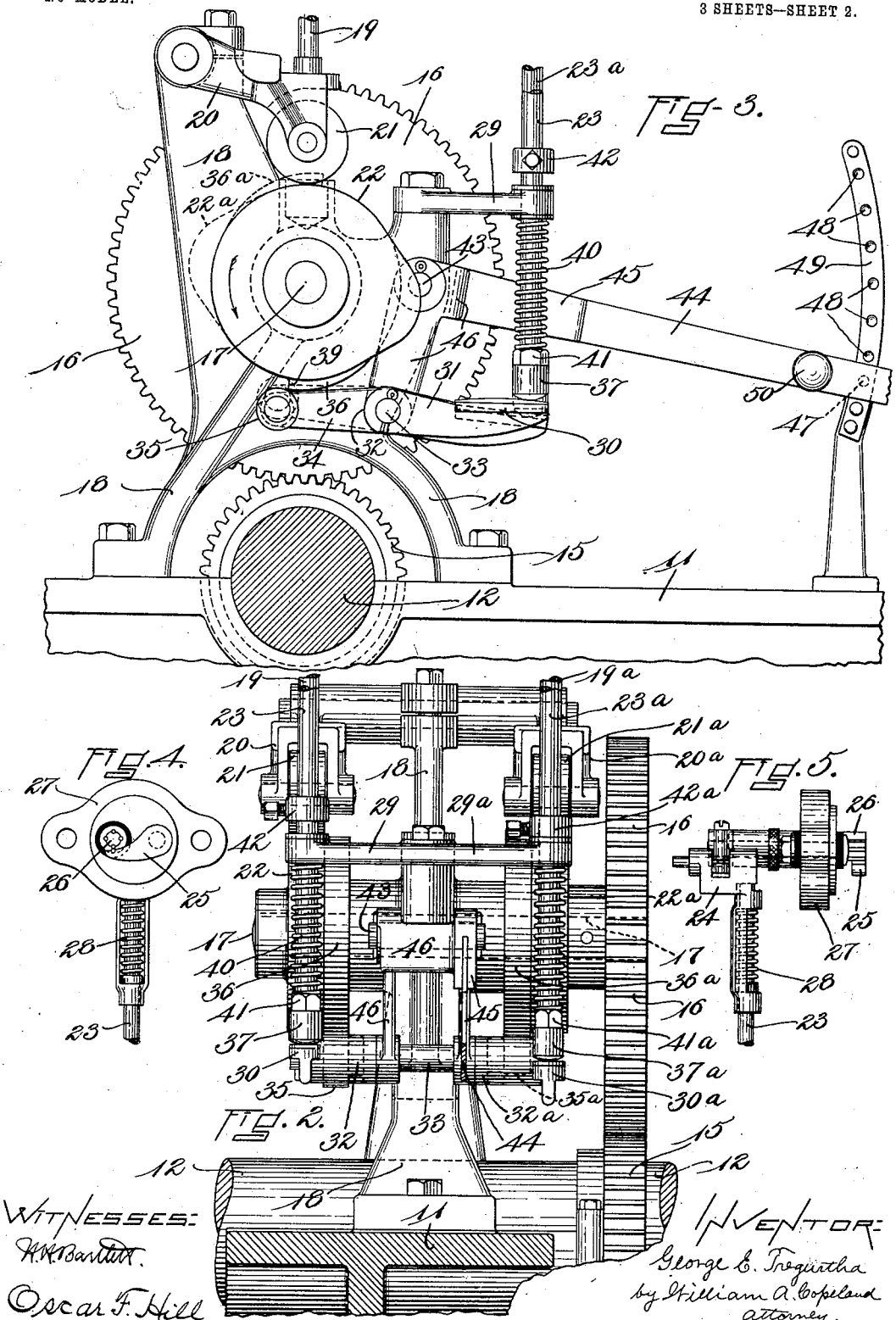

No. 761,271. PATENTED MAY 31, 1904.
G. E. TREGURTHA.
VARIABLE SPARKING MECHANISM.
APPLICATION FILED JUNE 18, 1903.
NO MODEL. 3 SHEETS—SHEET 3.

WITNESSES:
A. H. Bartlett.
Oscar F. Hill.

INVENTOR:
George E. Tregurtha
by William A. Copeland
attorney

No. 761,271. Patented May 31, 1904.

UNITED STATES PATENT OFFICE.

GEORGE E. TREGURTHA, OF MALDEN, MASSACHUSETTS.

VARIABLE-SPARKING MECHANISM.

SPECIFICATION forming part of Letters Patent No. 761,271, dated May 31, 1904.

Application filed June 18, 1903. Serial No. 161,959. (No model.)

*To all whom it may concern:*

Be it known that I, GEORGE E. TREGURTHA, of Malden, in the county of Middlesex and State of Massachusetts, have invented certain new and useful Improvements in Variable-Sparking Mechanism, of which the following is a specification.

The invention relates to gas-engines and the like which are operated by explosions. The explosion is usually occasioned by an electric spark, which is produced by the separation of two contact-points. The make and break between the contacts is usually controlled by the movement of a shaft or rod called the "igniter-rod."

The speed and power of the engine vary according to the position of the piston when the explosion occurs. The speed and power are greatest if the ignition occurs slightly before the piston reaches its highest position, thereby enabling the expansive force to act during the entire downward stroke of the piston. The speed is slowest when the ignition occurs after the piston has reached its highest point, so that the expansive force resulting from the explosion will not begin to act until after the piston has begun its descent.

The object of the present invention is to provide mechanism whereby the time of ignition relative to the position of the piston may be varied, so as to vary the power and speed of the engine.

The invention is especially intended for application to a two-cylinder engine, and the drawings illustrate the invention as so applied; but it is not intended to limit the scope of the invention to use with a two-cylinder engine, as it will be obvious that with modifications it is adapted for use with engines employing more or less than two cylinders.

In the drawings, Figure 1 is a front elevation of a two-cylinder marine engine embodying the invention, the left-hand igniter-rod being in its highest position, the electrical contact made, and the cam-roll just about to drop off of the cam which actuates the igniter-rod to separate the points and produce the spark, the right-hand igniter-rod being in its lowest position. Fig. 2 is an enlarged front elevation of the variable mechanism shown in Fig. 1, partly in section, through the adjusting-lever and the bed, the parts being in the same position as in Fig. 1. Fig. 3 is a side elevation of Fig. 2 viewed from the left-hand side. Fig. 4 is an inside view of the igniting device. Fig. 5 is a side elevation of the igniting device seen from the left of Fig. 4. Fig. 6 is a detail plan, partly in section, showing the adjusting-lever and the igniter-rods and the guides for the igniter-rods and the levers which actuate the igniter-rods.

Referring now to the drawings, 1 and 2 represent the two cylinders; 3 4, the respective heads which inclose the compression-chambers and valve mechanisms and igniters; 5 and 6, the inlet-valve stands; 7 and 8, the inlet-pipes. The exhaust-pipes being on the opposite side are not shown.

9 10 are the bases of the cylinders, and 11 is the bed.

12 is the crank-shaft, with cranks 13 14, (shown in dotted lines,) the cranks being in opposite positions. The driving-gear 15 is mounted on crank-shaft 12 and meshes with the secondary gear 16, mounted on shaft 17. (Shown in dotted lines.) Said shaft 17 is held in a supporting-stand 18. The exhaust-valve rods being behind the igniter-rods are not shown in Figs. 1 and 2. In Fig. 3 the exhaust-valve rod 19 of the left-hand cylinder is shown and is connected with lever 20, which carries a cam-roll 21, engaging with and actuated by a cam 22 on shaft 17.

The parts thus far described are not claimed as new, but are mentioned briefly to show the completeness of the engine.

Each cylinder is provided with its own igniting and valve apparatus, each operating in its own proper sequence and alternately. A description of one will answer for both.

Cylinder 1 is provided with igniter-rod 23, pivotally connected at its upper end to the rocker-arm 24 of the movable electrode 25, which contacts with the fixed insulated electrode 26, mounted on the body 27, secured to the cylinder. The rod 23 has an elastic connection 28 with the rocker-arm to provide for and take up wear of the electrodes. The lower end of said rod 23 passes through guide-arm 29, and its lower end rests on pallet end 30 of rocking lever 31. Said rocking lever is provided with a hub 32, by which it is fulcrumed on stud 33. Extending rearwardly from the hub 32 of said rocking lever is an arm 34, which carries a roller 35, which engages with a cam 36 on shaft 17. The rotation of the cam 36 causes the lever 31 to rock on its fulcrum, and thereby to raise and lower the igniter-rod 23. The lower end 37 of the igniter-rod, which rests on the pallet, is preferably rounded off to engage with the varying position of the pallet. The pallet is suitably shaped for contact with the lower end of the igniter-rod through the range of movement of the adjusting-lever. The form of the cam 36 is such that the igniter-rod 23 will begin to rise about one-eighth of a revolution before the point 39 on the cam reaches the cam-roll 35, thus bringing the movable electrode 25 into contact with the fixed electrode 26, as shown in Fig. 4, before the cam-roll drops off of the highest point 39 of the cam. When the point 39 on the cam passes the cam-roll 35, the spring 40 will push down the igniter-rod 23, and thereby suddenly separate the contact-points, thus producing a spark. The lower end of spring 40 rests on a nut 41 on said rod 23, and the upper end bears against the under side of guide 29, through which rod 23 passes. Clamped to the rod 23 is a collar 42, which engages with guide 29 in the downward stroke of rod 23 and limits the downward movement of the rod. The said collar is preferably so adjusted that when the cam-roll 35 drops off of the point of the cam the rod will not descend quite far enough to bring the said roll into contact with the cam, and it will thus be kept from contact until the cam revolves far enough to bring the incline of the cam around to the cam-roll.

The limiting of the movement of the igniter-rod as described prevents wear and also serves to limit the interval of separation of the contact-points of the electrodes.

Cylinder 2 is provided with igniter-rod 23ᵃ, which operates igniter mechanism similar to that described in connection with igniter-rod 23 and in similar manner, the description of the one applying also to the other, the numerals for the corresponding parts being duplicated with the addition of the letter ᵃ for those in the second set.

Fulcrumed on fixed stud 43, mounted in the stand 18, is the adjusting-lever 44, which is forked, forming two arms 45 46, through both of which the stud 43 passes. Through the lower ends of arms 45 46 passes the pin 33, which forms the fulcrum of rocking levers 31 and 31ᵃ. The outer end of adjusting-lever 44 is provided with a pin 47, which is adapted to engage with any one of a series of indentations 48 on the arc-shaped arm 49 to hold the adjusting-lever in any desired position. The arm 49 is supported with relation to the rest of the mechanism in any suitable way.

It is obvious that by raising or lowering the outer end of adjusting-lever 44 the position of fulcrum 33 will be changed, thereby changing the position of cam-roll 35 in relation to the cam, and thus varying the time of action of the igniter. It is obvious that any change in the time of action of one igniter will make a corresponding change in the action of the other igniter, thus maintaining a constant relation between the two igniters.

It is obvious that in the varying positions of the fulcrum 33 it will move in the arc of a circle whose center is the fulcrum 43 of the adjusting-lever 44, and the lever 31 will therefore be moved forward or back with relation to the igniter-rod 23, and the point of contact of the lower end of the igniter-rod with the pallet 30 will shift position on the pallet. As the fulcrum 33 varies its position in the arc of a circle it will cause the lever 31 to vary its angle with relation to the igniter-rod when the cam 22 is in position for the igniter-rod to be in its lowermost position. If the face of the pallet were flat, that also would vary in inclination to the igniter-rod, and as the lower end of the igniter-rod shifts its point of contact with the pallet according to the shifting of position of the pallet the lowermost position of the igniter-rod would also vary. It is, however, important that the igniter-rod should have a uniform range of movement and the same lowermost point of starting through all the varying positions of the adjusting-lever. In order to accomplish this, the pallet 30 is formed with a convex upper surface of such configuration as to compensate for the varying angles of the lever 31, thus making the lowermost position of the igniter-rod constant—that is, the curved face of the pallet is such that although the lever 31 moves forward or back when adjusted it will always engage the lower end of the igniter-rod when the igniter-rod is in the lowest position permitted by its stop in such manner that it will always be ready to lift the igniter-rod under the action of the cam, starting with the igniter-rod in exactly the same position each time, the only difference being as to the time when the start shall be made.

The adjusting-lever 44 may be provided with a handle 50 for convenience of manipulation.

What I claim is—

1. In a gas or gasolene engine, in combination with a reciprocable igniter-rod; an ignition device operated thereby, a rotating cam, a rocking lever on a movable fulcrum, one arm of which has a convex pallet-surface which engages the lower end of said rod and the other arm of which engages with said cam during at least a part of the rotation of the cam to actuate said igniter-rod, and mechanism for varying the position of the fulcrum of said rocking lever, the curved surface of the pallet being such as to maintain a uniform lowermost position of the igniter-rod and securing the same range of movement of the igniter-rod through all of the movements of said fulcrum, substantially as described.

2. In a gas or gasolene engine, in combination with a reciprocable igniter-rod, an ignition device operated thereby, a rocking lever on a movable fulcrum one arm of which engages the lower end of the igniter-rod, mechanism which rocks said lever to actuate the igniter-rod, means for varying the position of the fulcrum of said rocking lever, and a curved contact-surface between the igniter-rod and the rocking lever which maintains a uniform lowermost position of the igniter-rod and secures the same range of movement of the igniter-rod through all the movements of the fulcrum, substantially as described.

In testimony whereof I have affixed my signature in presence of two witnesses.

GEORGE E. TREGURTHA.

Witnesses:
JAMES TREGURTHA,
FREDERICK S. MANN.